United States Patent [19]

Mori et al.

[11] 4,341,753

[45] Jul. 27, 1982

[54] METHOD AND APPARATUS FOR CONVERTING SULFUR DIOXIDE IN GAS TO SULFUR

[75] Inventors: Toshikatsu Mori; Teruo Kumagai, both of Hitachi; Shimpei Matsuda, Tokai; Fumito Nakajima, Hitachi, all of Japan

[73] Assignees: Hitachi, Ltd.; Babcock-Hitachi Kabushiki Kaisha, both of Tokyo, Japan

[21] Appl. No.: 184,759

[22] Filed: Sep. 8, 1980

[30] Foreign Application Priority Data

Sep. 7, 1979 [JP] Japan .................................. 54/115531

[51] Int. Cl.$^3$ ............................................ C01B 17/04
[52] U.S. Cl. .............................. 423/569; 423/574 R; 423/DIG. 5; 422/110; 422/111
[58] Field of Search ............... 423/574, 576, 569, 570; 422/110, 111

[56] References Cited

U.S. PATENT DOCUMENTS

| | | | |
|---|---|---|---|
| 1,917,685 | 7/1933 | Bacon et al. | 423/570 |
| 1,967,263 | 7/1934 | Rosenstein | 423/569 X |
| 3,764,665 | 10/1973 | Groenendaal et al. | 423/574 |
| 3,970,744 | 7/1976 | Riesenfeld | 423/574 R |
| 4,021,201 | 5/1977 | Vautrain et al. | 423/574 |
| 4,060,589 | 11/1977 | Haas et al. | 423/569 X |
| 4,100,266 | 7/1978 | Smith | 423/574 R |
| 4,207,304 | 6/1980 | Beavon | 423/574 |

FOREIGN PATENT DOCUMENTS 1390694 4/1975 United Kingdom ................ 423/569

*Primary Examiner*—G. O. Peters
*Attorney, Agent, or Firm*—Thomas E. Beall, Jr.

[57] ABSTRACT

There is provided a method for converting sulfur dioxide in an exhaust gas to sulfur, which comprises the reduction step of reducing sulfur dioxide in an exhaust gas containing water vapor to hydrogen sulfide in the presence of carbon, a part of the exhaust gas is caused to bypass the reduction step and the remainder of the exhaust gas is fed to the reduction step to convert sulfur dioxide in the exhaust gas to hydrogen sulfide; the gas from the reduction step is mixed with the exhaust gas bypassing the reduction step while controlling the amount of the bypassing exhaust gas so that the ratio of hydrogen sulfide to sulfur dioxide in the mixed gas is maintained at 2; the mixed gas is fed to the Claus reaction step; and the Claus reaction step of reacting hydrogen sulfide formed at the reduction step with sulfur dioxide to convert hydrogen sulfide to sulfur.

3 Claims, 2 Drawing Figures

METHOD AND APPARATUS FOR CONVERTING SULFUR DIOXIDE IN GAS TO SULFUR

BACKGROUND OF THE INVENTION

The present invention relates to a method and apparatus for converting sulfur dioxide in a gas, especially in a coal combustion exhaust gas, to sulfur.

Various methods for converting sulfur dioxide in a gas to sulfur have heretofore been proposed. For example, Japanese Patent Application Laid-Open Specification No. 120295/77 discloses a method in which sulfur dioxide in an exhaust gas is reduced to hydrogen sulfide and sulfur with a reducing gas such as hydrogen or carbon monoxide or hydrocarbon at the temperature between 950° C. and 1250° C., hydrogen sulfide formed at the reduction step is mixed with unreacted sulfur dioxide in the exhaust gas while controlling the amount of the reducing gas to be added to the reduction step so that the ratio of hydrogen sulfide to sulfur dioxide in the mixed gas is maintained at a predetermined level, preferably 2, and hydrogen sulfide formed at the reduction step is reacted with sulfur dioxide to convert hydrogen sulfide to sulfur according to Claus reaction formula.

The known method, however, has such disadvantage that the ratio of removal of sulfur is very low, since it is very difficult to maintain the ratio of hydrogen sulfide to sulfur dioxide in the gas after the reduction reaction only by controlling the amount of the reducing gas to be added. Namely, this ratio is greatly changed according to the composition of the exhaust gas fed to the reduction step and the reduction reaction conditions. If this ratio deviates from 2, either of $SO_2$ and $H_2S$ is left in the treated gas. The composition of the exhaust gas is changed according to combustion conditions, absorption conditions and desorption conditions.

SUMMARY OF THE INVENTION

Object of the present invention is to provide a method for converting sulfur dioxide in gas to sulfur in which a high ratio of removal of sulfur is obtained, and an apparatus for practising this method.

Another object of the present invention is to provide a method for converting sulfur dioxide in gas to sulfur in which sulfur dioxide in a gas is converted to sulfur in response to the composition of the gas, and an apparatus for practising this method which is simple in construction.

According to the present invention, this object is attained by a method characterized by controlling the amount of the gas containing sulfur dioxide so that the ratio of hydrogen sulfide formed in a reducing step to sulfur dioxide in the gas is maintained at a predetermined level.

An apparatus for the practical application of this method is characterized by means for controlling the amount of the gas containing sulfur dioxide so that the ratio of hydrogen sulfide formed in reducing means for reducing sulfur dioxide in the gas to hydrogen sulfide to sulfur dioxide is maintained at a predetermined level.

DETAILED DESCRIPTION OF THE PREFERRED EMBODIMENT

Sulfur dioxide in a coal combustion exhaust gas is concentrated by absorption on carbon and desorption prior to reduction step, since a large quantity of the exhaust gas should be treated at the reduction step and excessive carbon is consumed by reaction between oxygen in the coal combustion exhaust gas and carbon, when the coal combustion exhaust gas is directly supplied to the reduction step. As the adsorbent, there can be effectively used activated coal (semi-coke) obtained by dry distillation of coal at about 550° to about 750° C.

The resulting oxygen-free exhaust gas is fed to the reduction step.

Figure 1:
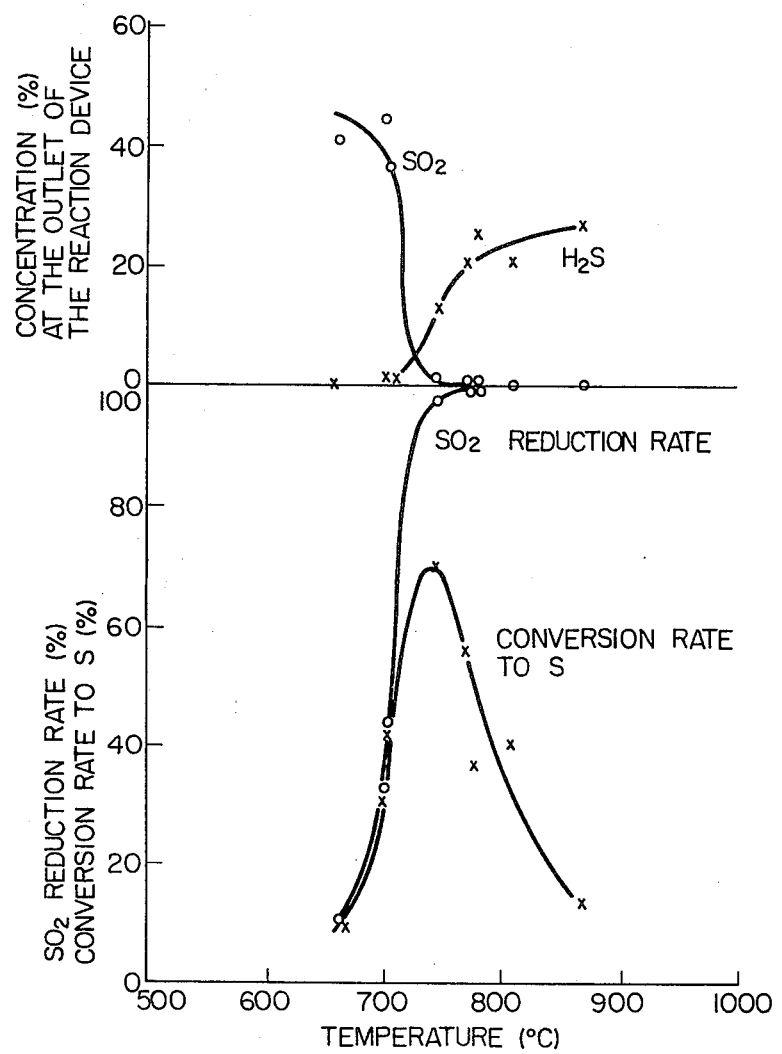
FIG. 1 is a diagram illustrating results of some experiments of reducing $SO_2$ with semi-coke.

When an exhaust gas obtained by concentrating sulfur dioxide in the coal combustion exhaust gas is reduced with semi-coke, as shown in FIG. 1, the ratio of reduction of sulfur dioxide (hereinafter referred to as "$SO_2$") is elevated with increase of the temperature but the conversion of $SO_2$ to sulfur (hereinafter referred to as "S") becomes highest at about 750° C.

Hydrogen sulfide (hereinafter referred to as "$H_2S$") formed at the reduction step is converted to sulfur according to the following Claus reaction formula:

$$SO_2 + 2H_2S \rightarrow 3S + 2H_2O$$

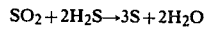

If the ratio of $H_2S$ to $SO_2$ in the gas from the reduction step in the state where the conversion to S is highest is always maintained at 2, the exhaust gas from the reduction step can be supplied directly to the Claus reaction step.

The exhaust gas from the reduction step contains unreacted $SO_2$ therein. Accordingly, $H_2S$ can be converted to S by controlling the amount of the gas containing $SO_2$ so that the ratio of $H_2S$ to $SO_2$ is maintained at 2 in the state where the conversion to S is highest.

The unreacted $SO_2$ can be obtained by separating the exhaust gas obtained by concentrating $SO_2$ in the coal combustion exhaust gas prior to the reduction step.

One part of the exhaust gas separated prior to the reduction step is fed to the reduction step to be reduced to $H_2S$ with semi-coke at about 750° C., and the other part of the exhaust gas bypasses the reduction step and is mixed with $H_2S$ formed at the reduction step.

The amount of the other part of the exhaust gas is controlled so that the ratio of $H_2S$ to $SO_2$ in the mixed gas is maintained at 2.

The mixed gas in which the ratio of $H_2S$ to $SO_2$ is maintained at 2 is fed to the Claus reaction step to convert $H_2S$ to S.

Figure 2:
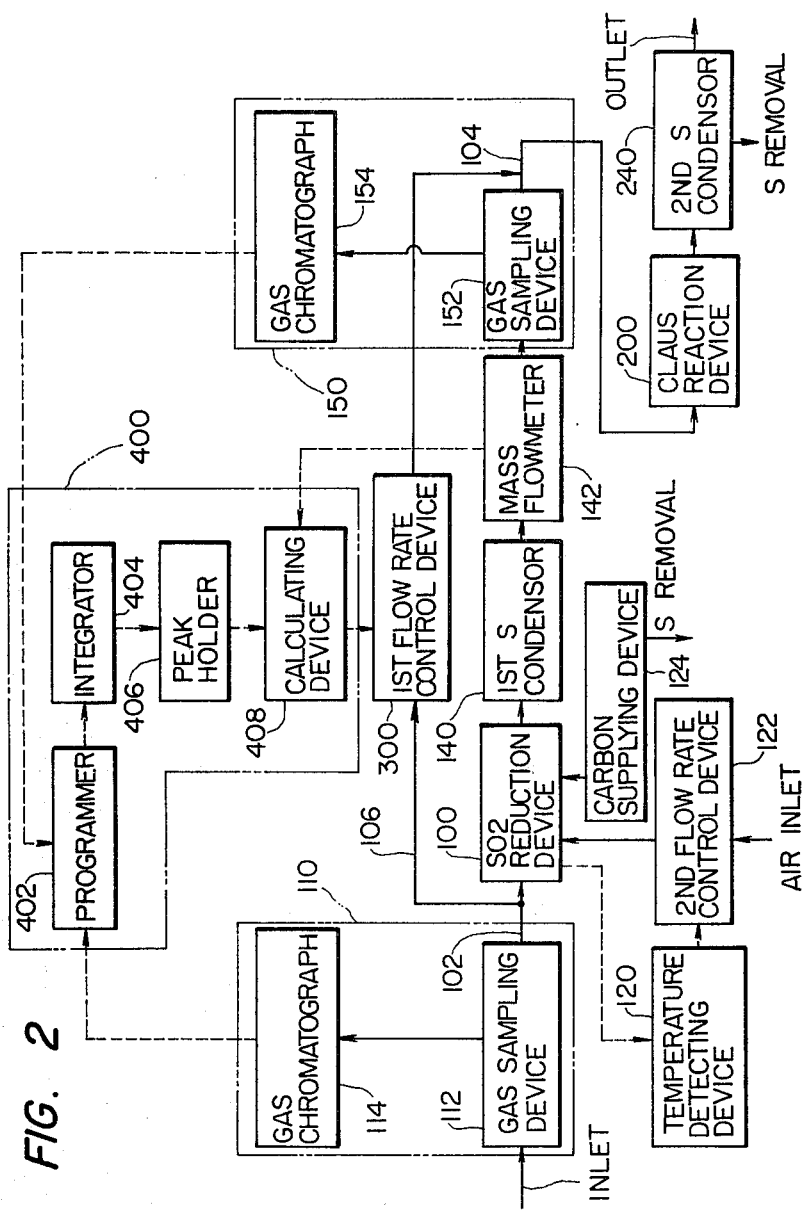
FIG. 2 is a flow sheet showing one embodiment of the apparatus for practical application of the method according to the present invention.

One embodiment of an apparatus for practical application of the method according to the present invention is shown in FIG. 2. Referring to FIG. 2, a coal combustion exhaust gas containing $SO_2$, water vapor and the like is introduced into a $SO_2$ reduction device 100 through a conduit 102.

A Claus reaction device 200 is connected to the $SO_2$ reduction device 100 through a conduit 104. A conduit 106 bypassing the $SO_2$ reduction device 100 is branched from the conduit 102 and connected to the conduit 104. A first flow rate control device 300 is arranged on the bypass conduit 106 so that the device 300 is operated by an operation control device 400. The operation control device 400 comprises a programmer 402, an integrator 404, a peak holder 406, and a calculating device 408.

The operation control device 400 is connected to a SO₂ concentration detecting device 110 comprising a gas sampling device 112 and a gas chromatograph 114 and mounted on the conduit 102 for detecting the SO₂ concentration in the exhaust gas at the inlet of the SO₂ reduction device 100. A mass flowmeter 142 is arranged on the conduit 102 between the SO₂ reduction device 100 and the Claus reaction device 200 for detecting the flow rate of the exhaust gas at the outlet of the SO₂ reduction device 100.

A SO₂ and H₂S concentrations detecting device 150 is arranged on the conduit 102 between the mass flowmeter 142 and the Claus reaction device 200 for detecting the SO₂ and H₂S concentrations in the exhaust gas from the SO₂ reduction device 100 at the outlet of the SO₂ reduction device 100. The SO₂ and H₂S concentrations detecting device 150 comprises a gas sampling device 152 and a gas chromatograph 154.

A temperature detecting device 120 is connected to the SO₂ reduction device 100 to detect the reduction temperature in the SO₂ reduction device 100. A carbon supplying device 124 is disposed in the SO₂ reduction device 100. A second flow rate control device 122 is connected to the SO₂ reduction device 100 for controlling the reduction temperature in the SO₂ reduction device 100 by supplying air into the SO₂ reduction device 100 in response to the temperature detecting device 120.

The gas chromatographs 114 and 154 are connected to the programmer 402 and the mass flowmeter 142 is connected to the calculating device 408 in the operation control device 400, respectively.

First and second S condensors 140 and 240 are arranged at the outlet of the SO₂ reduction device 100 and the Claus reaction device 200, respectively, to remove S formed at the SO₂ reduction device 100 and the Claus reaction device 200, respectively, from the exhaust gas. The first flow rate control device 300 is operated by the operation control device 400 so that the H₂S/SO₂ ratio in the exhaust gas at the inlet of the Claus reaction device 200 is maintained at a predetermined level. More specifically, the SO₂ concentration (%), $C^0_{SO2}$, in the exhaust gas is detected at the gas chromatograph 114, the flow rate (Nm³/h), G, of the gas at the outlet of the SO₂ reduction device 100 is detected at the mass flowmeter 142, and the SO₂ concentration (%), $C_{SO2}$, and the H₂S concentration (%), $C_{H2S}$, of the gas at the outlet of the SO₂ reduction device 100 are detected at the gas chromatograph 154. The flow amount (Nm³/h), $G^0$, of the bypass gas which provides the H₂S/SO₂ ratio of 2 in the gas at the inlet of the Claus reaction device 200 is calculated in the operation control device 400 in accordance with the following formula:

$$\frac{GC_{H2S}}{GC_{SO2} + G^0 C^0_{SO2}} = 2 \quad (1)$$

$$G^0 = \frac{G}{2C^0_{SO2}}(C_{H2S} - 2C_{SO2}) \quad (2)$$

Accordingly, the above-mentioned ratio can be maintained at 2 by controlling the flow amount of the bypass gas so that the relation of the formula (2) is established.

The present invention will now be described in detail with reference to the following Examples.

EXAMPLE 1

A coal combustion exhaust gas containing 1050 ppm of SO₂, which was discharged at a rate of 10,000 Nm³/h, was fed to a packed layer (moving bed) of semi-coke obtained by dry distillation at 600° C. for 1 hour and steam activation at 700° C. for 2 hours, and SO₂ was adsorbed on the semi-coke at 130° to 140° C. The SO₂-adsorbed semi-coke was continuously fed to a desorption column and SO₂ was desorbed at 350° C. to obtain a gas (desorption gas) containing 29% of SO₂, 14% of CO₂ and 57% of H₂O at a flow rate of 34 Nm³/h. A part of this gas was fed to a reduction column (moving bed; moving speed = 15 l/h) packed with 17 l of coal which had been subjected to dry distillation at 600° C. for 1 hour, and SO₂ was reduced at 750° C. The reduced gas was cooled to 150° C. to condense formed S, which was then removed. Then, the flow amount of the gas was measured by an orifice meter and the SO₂ and H₂S concentrations were determined by a process gas chromatograph. The obtained values were put in a control circuit adjusted to control the values so as to satisfy the condition of the formula (2), and the flow rate of the bypass gas was controlled by a control valve actuated co-operatively by the control circuit. The bypass gas was mixed with the gas from which S had been removed, and the mixed gas was fed to the Claus reaction step and reaction was carried out at SV of 2000 h⁻¹ in the presence of an alumina catalyst under such conditions that the temperature at the inlet of the reaction column was 250° C. and the temperature at the outlet was 310° C. The gas which had been subjected to the Claus reaction was cooled and S was removed. The ratio of removal of S first removed and S now removed was 88% based on the amount of SO₂ at the inlet of the reduction column. In this case, the flow rate of the bypass gas was 3.1 Nm³/h, and the flow rate of the gas after first removal of S was 33.2 Nm³/h. The SO₂ and H₂S content in this gas were 1.4% and 8.2%, respectively.

COMPARATIVE EXAMPLE 1

SO₂ was converted to S under the same conditions as described in Example 1 except that all the gas was reduced at the reduction step without causing a part of the gas to bypass the reduction step. The ratio of removal of S was 68% based on the amount of SO₂ at the inlet of the reduction column.

What is claimed is:

1. A method for converting sulfur dioxide in an exhaust gas containing sulfur dioxide, hydrogen sulfide and water to sulfur comprising:
   (a) reducing the sulfur dioxide in the exhaust gas in the presence of carbon at the temperature of approximately 750° C. to produce a gas containing hydrogen sulfide, sulfur dioxide and sulfur, a part of the exhaust gas being caused to bypass said reduction step;
   (b) removing sulfur produced in (a);
   (c) reacting hydrogen sulfide formed at (a) with sulfur dioxide in a Claus reactor to convert hydrogen sulfide to sulfur, the gas from (a) being mixed with the bypassed exhaust gas;
   (d) removing the sulfur produced in (c); and
   (e) controlling the flow rate of the exhaust gas caused to bypass (a) in response to the concentration of the sulfur dioxide in the exhaust gas prior to bypassing, the flow rate of the gas containing sulfur dioxide and hydrogen sulfide formed at (a), and the concentration of sulfur dioxide and hydrogen sulfide contained in the gas containing sulfur dioxide and hydrogen sulfide, so that the ratio of hydrogen sulfide to sulfur dioxide in the mixed gas fed to the Claus reactor is maintained at 2.

2. Apparatus for converting $SO_2$ in an exhaust gas containing $SO_2$ to S comprising:
   (a) means for measuring the $SO_2$ concentration in the exhaust gas stream and generating a signal;
   (b) means for dividing the exhaust gas stream into a first and a second stream;
   (c) means for passing said first stream into a reduction reactor;
   (d) means for removing a gas stream containing $H_2S$, S, $SO_2$ from the reactor;
   (e) means for removing S from said stream from the reactor;
   (f) means for measuring the $SO_2$ and the $H_2S$ concentration and the flow rate of said stream from the reactor and generating a signal;
   (g) means for combining said stream from the reactor with said second stream from (b) and passing said combined stream to a Claus reactor;
   (h) means for removing S from the product gas of said Claus reactor; and
   (i) means for controlling the flow of gas in said second stream based on signals generated by (a) and (f) above to maintain the ratio of $H_2S$ to $SO_2$ in the feed to the Claus reactor at 2.

3. Apparatus according to claim 2, also comprising means to maintain the reducing temperature in the reducing means at approximately 750° C.

* * * * *